United States Patent
Hayes et al.

(10) Patent No.: US 12,350,674 B2
(45) Date of Patent: Jul. 8, 2025

(54) HEADSPACE ELIMINATING MICROTITER PLATE LID AND METHOD OF OPTICALLY MEASURING WELL OXYGEN CONCENTRATION THROUGH THE LID

(71) Applicant: Agilent Technologies, Inc., Santa Clara, CA (US)

(72) Inventors: Ian M. Hayes, Glounthaune (IE); James N. Hynes, Ovens (IE)

(73) Assignee: Agilent Technologies, Inc., Santa Clara, CA (US)

( * ) Notice: Subject to any disclaimer, the term of this patent is extended or adjusted under 35 U.S.C. 154(b) by 2 days.

(21) Appl. No.: 18/453,252

(22) Filed: Aug. 21, 2023

(65) Prior Publication Data
US 2023/0390776 A1 Dec. 7, 2023

Related U.S. Application Data (62) Division of application No. 16/613,506, filed as application No. PCT/US2018/032713 on May 15, 2018, now Pat. No. 12,059,683.
(Continued)

(51) Int. Cl.
*B01L 3/00* (2006.01)
*G01N 31/22* (2006.01)

(52) U.S. Cl.
CPC ........ *B01L 3/50853* (2013.01); *G01N 31/225* (2013.01); *B01L 3/50825* (2013.01);
(Continued)

(58) Field of Classification Search
CPC .... B65D 47/141; B65D 51/002; B65D 47/32; B65D 51/1622; B01L 3/50853;
(Continued)

(56) References Cited

U.S. PATENT DOCUMENTS 2,649,090 A  8/1953  Harlan et al.
2,655,280 A  10/1953  Cuttell et al.
(Continued)

FOREIGN PATENT DOCUMENTS

CN   102226766 A   10/2011
EP    1134583 A1    9/2001
(Continued)

OTHER PUBLICATIONS

EPO, "Extended European Search Report mailed on Dec. 15, 2020," Application No. 18803269.2, 7 pages.
(Continued)

*Primary Examiner* — Shawn M Braden (57) ABSTRACT

An implement for eliminating headspace in the testing space(s) ($T_9$ or $MP_{Well}$) of a test tube (T) or microtiter plate (MP), and methods of using such implements to measure oxygen concentration in a test sample. The implement projects into a test chamber ($T_9$ or $MP_{Well}$) to displace a portion of a fluid sample within the test chamber ($T_9$ or $MP_{Well}$) and has longitudinally extending grooves (109 and 229) through which the displaced fluidic content can be discharged from the test chamber ($T_9$ or $MP_{Well}$).

14 Claims, 5 Drawing Sheets

Related U.S. Application Data (60) Provisional application No. 62/506,779, filed on May 16, 2017.

(52) U.S. Cl.
CPC . *B01L 2200/0689* (2013.01); *B01L 2300/042* (2013.01); *B01L 2300/049* (2013.01); *B01L 2300/0829* (2013.01); *B01L 2300/10* (2013.01)

(58) Field of Classification Search
CPC ......... B01L 3/50825; B01L 2200/0689; B01L 2300/042; B01L 2300/049; B01L 2300/0829; B01L 2300/10; G01N 31/225
See application file for complete search history.

(56) References Cited

U.S. PATENT DOCUMENTS

| | | | |
|---|---|---|---|
| 3,164,279 A * | 1/1965 | Towns | B01L 3/50825 215/307 |
| 3,164,297 A | 1/1965 | Atlee | |
| 3,483,997 A | 12/1969 | Ritter | |
| 5,203,825 A | 4/1993 | Haynes et al. | |
| 5,462,879 A | 10/1995 | Bentsen | |
| 5,741,463 A | 4/1998 | Sanadi | |
| 5,863,460 A | 1/1999 | Slovacek et al. | |
| 5,864,984 A | 2/1999 | McNertney | |
| 6,232,270 B1 | 5/2001 | Branly et al. | |
| 6,258,325 B1 | 7/2001 | Sanadi | |
| 6,306,620 B1 | 10/2001 | Templeton et al. | |
| 6,646,264 B1 | 11/2003 | Modiano et al. | |
| 9,234,619 B2 * | 1/2016 | Chang | B65D 59/02 |
| 10,117,615 B1 | 11/2018 | Young et al. | |
| 10,729,616 B2 | 8/2020 | Vedrine | |
| 2001/0029794 A1 | 10/2001 | Frye et al. | |
| 2002/0195448 A1 | 12/2002 | Mathus et al. | |
| 2003/0040011 A1 | 2/2003 | Barth et al. | |
| 2004/0033575 A1 | 2/2004 | Van et al. | |
| 2004/0241783 A1 | 12/2004 | Papkovsky et al. | |
| 2005/0112715 A1 | 5/2005 | Zayed et al. | |
| 2005/0176155 A1 | 8/2005 | Klein et al. | |
| 2007/0000950 A1 | 1/2007 | Ingram et al. | |
| 2008/0050768 A1 | 2/2008 | Baron et al. | |
| 2009/0260281 A1 | 10/2009 | Conrad | |
| 2010/0055698 A1 | 3/2010 | Stibelli et al. | |
| 2011/0136247 A1 | 6/2011 | Papkovsky et al. | |
| 2014/0329332 A1 | 11/2014 | Papkovsky et al. | |
| 2015/0132841 A1 | 5/2015 | Sampson et al. | |

FOREIGN PATENT DOCUMENTS

| | | |
|---|---|---|
| GB | 2448709 A | 10/2008 |
| WO | 9636875 A1 | 11/1996 |
| WO | 9812348 A1 | 3/1998 |
| WO | 9854354 A1 | 12/1998 |
| WO | 0169243 A1 | 9/2001 |
| WO | 02072423 A1 | 9/2002 |
| WO | 2009128998 A1 | 10/2009 |
| WO | 2013014413 A1 | 1/2013 |
| WO | 2013075736 A1 | 5/2013 |
| WO | 2016155618 A1 | 10/2016 |
| WO | 2018213275 A1 | 11/2018 |

OTHER PUBLICATIONS

USPTO, "International Search Report and Written Opinion mailed on Jul. 31, 2018," Application No. PCT/US2018/32713, 15 pages.

* cited by examiner

HEADSPACE ELIMINATING MICROTITER PLATE LID AND METHOD OF OPTICALLY MEASURING WELL OXYGEN CONCENTRATION THROUGH THE LID

CROSS-REFERENCE TO RELATED APPLICATION

This application is a divisional of U.S. Non-provisional application Ser. No. 16/613,506, filed on Nov. 14, 2019, which is a U.S. national stage entry of International Application No. PCT/US2018/032713, filed on May 15, 2018, which claims the benefit of U.S. Provisional Application No. 62/506,779, filed May 16, 2017, the contents of which are incorporated by reference in their entirety.

BACKGROUND

Test tubes and microtiter plates are commonly used with oxygen-sensitive photolumiscent probes to measure and monitor aerobic activity of a sample by measuring and monitoring oxygen concentration within the tube or well. This requires sealing of the sample from fluid communication with the surrounding environment, often accomplished by providing an oil layer over the sample and interrogating the oxygen-sensitive photolumiscent probes in the sample through the oil layer. Use of an oil layer to seal off the sample provides the additional benefit of limiting the presence of gaseous headspace between the sample and the oil layer. Gaseous headspace trapped underneath the oxygen barrier layer is known to slow detection of changes in oxygen concentration due to the relatively large supply of oxygen available in such gaseous headspace.

While generally effective at sealing off the sample from direct fluid communication with the surrounding environment and limiting the presence of gaseous headspace underneath the oil layer, the oil layer is not a particularly effective oxygen barrier, is difficult to properly and consistently deploy, and is labor intensive.

Accordingly, a substantial need exists for an effective, quick and easy implement and technique for efficiently sealing a sample in a test tube or well of a microtiter plate from fluid communication with the surrounding environment, which does not leave gaseous headspace between the oxygen barrier and the sample and does not interfere with interrogation of oxygen-sensitive photolumiscent probes in the sample through the implement.

SUMMARY OF THE INVENTION

An implement, such as a stopper for a test tube or a lid for a multi-well microtiter plate, for eliminating headspace in a testing cavity, and methods of using such implements in combination with one or more testing cavities to measuring oxygen concentration.

One embodiment of the implement is a stopper formed from an oxygen barrier material configured and arranged to longitudinally and sealingly project into a cavity of a test tube, the stopper having an outwardly projecting convex distal end and a plurality of longitudinally extending grooves operable for providing peripheral outlet channels between the stopper and the test tube through which fluidic content within the cavity of the test tube, displaced by insertion of the stopper into the cavity of the test tube, can be discharged from the cavity.

Another embodiment of the implement is a lid formed from an oxygen barrier material for a microtiter plate having any array of wells. The lid includes (A) a cover plate for engaging the microtiter plate, and (B) projections extending longitudinally from the cover plate in an array conforming with the array of wells, with each projection (i) configured and arranged to longitudinally and sealingly project into a corresponding well in the microtiter plate, (ii) having an outwardly projecting convex distal end, and (iii) having a plurality of longitudinally extending grooves operable for providing peripheral outlet channels between the projection and the well through which fluidic content within the well, displaced by insertion of the projection into the well, can be discharged from the well.

The lid may be combined with a microtiter plate, formed from an oxygen barrier material and having an array of wells, to form an assembly. The lid is configured and arranged for fitted engagement over the microtiter plate with the projections extending longitudinally from the cover plate in an array conforming with the array of wells in the microtiter plate whereby the projections extend into the wells when the lid is placed over the microtiter plate.

Oxygen concentration within a test tube may be measured with the stopper embodiment of the implement by (A) placing an oxygen-sensitive photoluminescent material and a fluid test sample within a cavity of a test tube, (B) inserting the implement into frictional engagement within the cavity of the tube to form an enclosed chamber, forming peripheral outlet channels between the implement and the test tube through which fluidic content within the cavity of the test tube, displaced by insertion of the implement into the cavity of the test tube, can be discharged from the cavity, and (C) ascertaining oxygen concentration within the enclosed chamber by (i) exposing the oxygen-sensitive photoluminescent material within the enclosed chamber to excitation radiation passed through the implement to create excited oxygen-sensitive photoluminescent material, (ii) measuring radiation emitted by the excited oxygen-sensitive photoluminescent material through the implement, and (iii) converting the measured emission to a target-analyte concentration based upon a known conversion algorithm.

Oxygen concentration within an array of wells in a microtiter plate may be measured with the lid embodiment of the implement by (A) placing an oxygen-sensitive photoluminescent material and a fluid test sample within the plurality of wells in the microtiter plate, (B) covering the microtiter plate with the cover plate whereby each projection extends into and sealingly engages within each well in the microtiter plate so as to displace fluid from within each well towards the periphery of the projection and out of the well through peripheral outlet channels formed between the projection and the well, and (C) ascertaining oxygen concentration within each well of the covered microtiter plate by (i) exposing the oxygen-sensitive photoluminescent material within each well to excitation radiation passed through the projection extending therein to create excited oxygen-sensitive photoluminescent material, (ii) measuring radiation emitted by the excited oxygen-sensitive photoluminescent material through the projection, and (iii) converting the measured emission to a target-analyte concentration based upon a known conversion algorithm.

DETAILED DESCRIPTION OF THE INVENTION

Nomenclature Table

| REF # | NAME |
|---|---|
| 100 | Stopper |
| 101 | Proximal End of Stopper |
| 102 | Distal End of Stopper |
| 109 | Longitudinal Grooves Along Stopper |
| 119 | Peripheral Outlet Channels |
| 200 | Lid |
| 210 | Cover Plate |
| 220 | Projections |
| 221 | Proximal End of Projections |
| 222 | Distal End of Projections |
| 229 | Longitudinal Grooves Along Projections |
| x | Longitudinal Direction |
| y | Lateral Direction |
| z | Transverse Direction |
| MP | Microtiter Plate |
| $MP_{Well}$ | Well in Microtiter Plate |
| T | Test Tube |
| $T_9$ | Cavity of Test Tube |

The invention is a plug for displacing fluid, predominantly gaseous headspace, from the cavity $T_9$ of a test tube T or well $MP_{Well}$ of a microtiter plate MP, without impacting top-down interrogation of oxygen-sensitive phololuminescent material placed within the cavity $T_9$ of a test tube T or well $MP_{Well}$ of a microtiter plate MP through a central optical light path.

Figure 1:
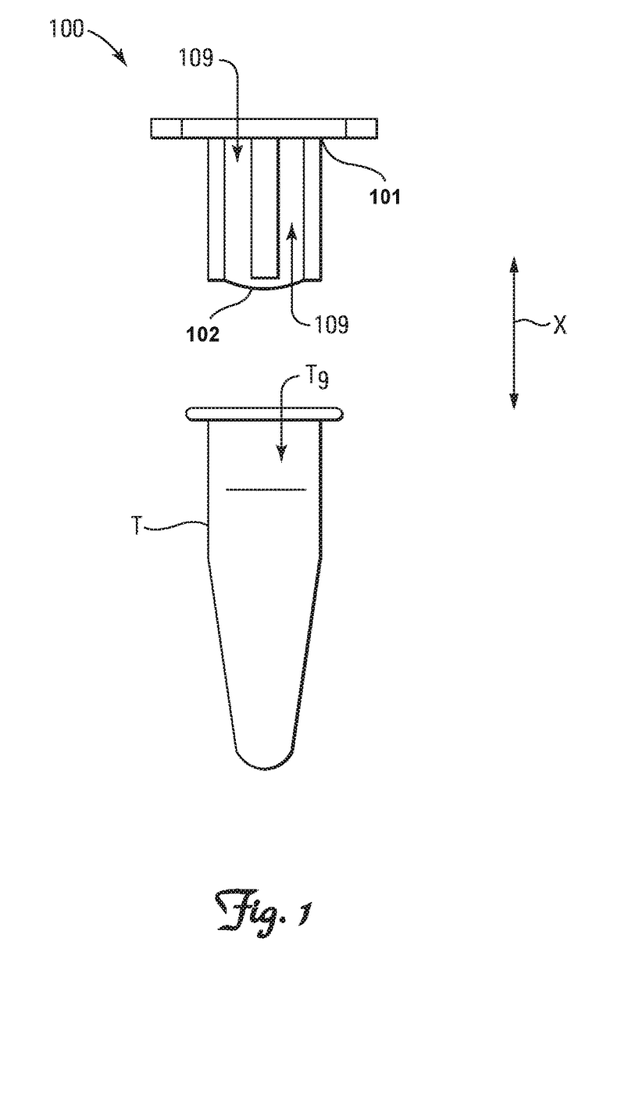
FIG. 1 is a side-view of a first embodiment of the invention, above a standard test tube.
Figure 2:
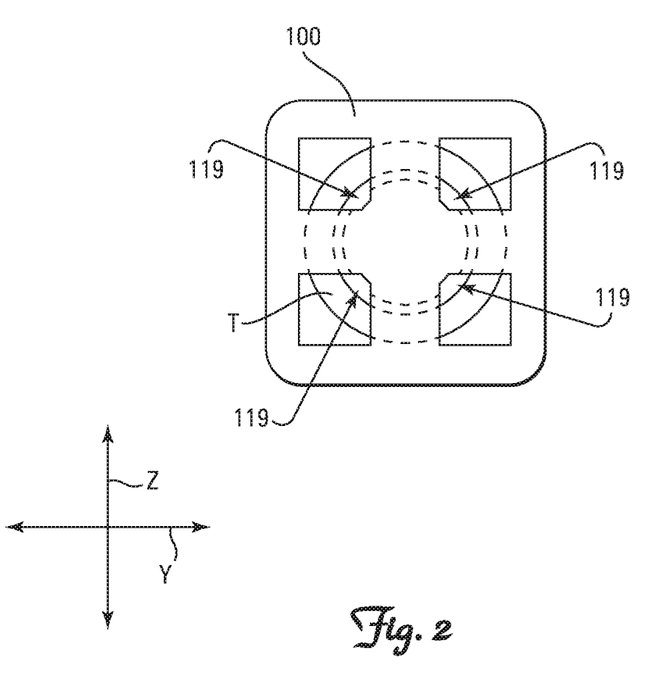
FIG. 2 is an enlarged top view of the invention depicted in FIG. 1 inserted into the test tube depicted in FIG. 1.
Figure 3:
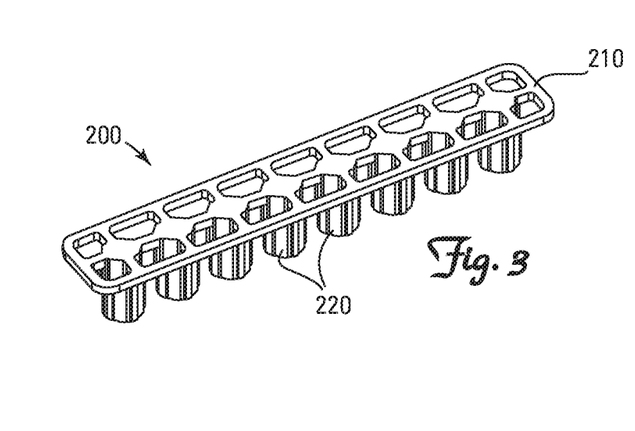
FIG. 3 is a perspective view of a second embodiment of the invention having a single row array of projections.
Figure 4:
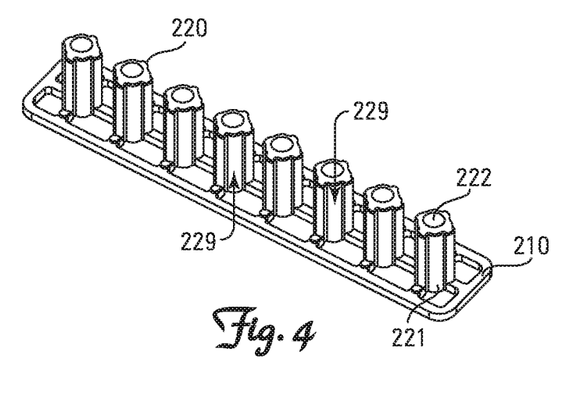
FIG. 4 is another perspective view of the lid depicted in FIG. 3.
Figures 5, 8, 9:
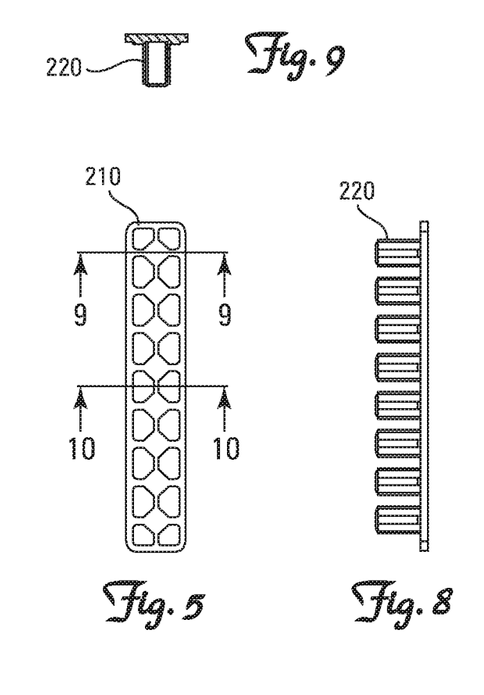
FIG. 5 is a top view of the lid depicted in FIG. 3.
FIG. 8 is a left side view of the lid depicted in FIG. 3.
FIG. 9 is a cross-sectional view of the lid depicted in FIG. 5 taken along line B-B.
Figure 6:
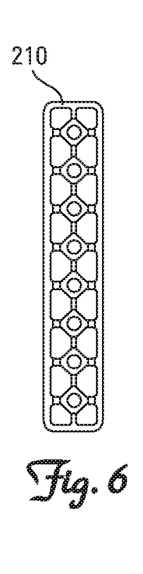
FIG. 6 is a bottom view of the lid depicted in FIG. 3.
Figure 7:
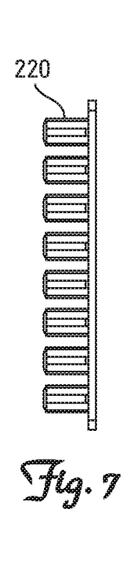
FIG. 7 is a right side view of the lid depicted in FIG. 3.
Figures 10, 11:
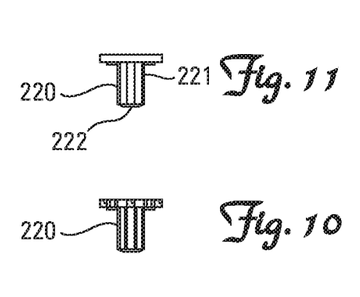
FIG. 10 is a cross-sectional view of the lid depicted in FIG. 5 taken along line C-C.
FIG. 11 is an end view of the lid depicted in FIG. 3.

Referring to FIGS. 1 and 2, a first embodiment of the invention is a stopper 100, configured and arranged for use with an individual test tube T. The stopper 100 has a proximal end 101 and a convex distal end 102, with a series of grooves 109 extending along the longitudinal length x of the stopper 100. When inserted into the cavity $T_9$ of a test tube T, the grooves 109 cooperate with the inner wall (unnumbered) of the test tube T to form peripheral outlet channels 119 through which fluid displaced from the cavity $T_9$ of a test tube T upon insertion of the stopper 100 can exit the cavity $T_9$.

The stopper 100 preferably has (−) a longitudinal length of between 0.5 to 2 cm, (−) a convex distal end 102 with a radius of curvature of between about 2 to 10 times the outer width y or z of the stopper 100, and (−) between 2 and 10, more preferably between 2 and 6, and most preferably between 4 and 6, uniformly circumferentially spaced longitudinally x extending grooves 109.

The grooves 109 are preferably configured, arranged and sized to form peripheral outlet channels 119 having a radial cross-section of between 0.2 and 4 mm² when the stopper 100 is sealingly engaged within the cavity $T_9$ of a test tube T.

The stopper 100 is preferably formed from an oxygen barrier material, most preferably a material having an oxygen transmission rate of less than 16 cm³/m²/24 hr at 23° C. and 0% RH.

Referring to FIGS. 3-12, a second embodiment of the invention is a lid 200 comprising a cover plate 210 for engaging a microtiter plate MP, and an array of projections 220 extending longitudinally x from the cover plate 210 so as to conform to and mate with an array of wells $MP_{Well}$ in the microtiter plate MP. Each projection 220 has a proximal end 221 and a convex distal end 222, with a series of grooves 229 extending along the longitudinal length x of the projection 220. When the cover plate 210 is attached over a microtiter plate MP, each of the projections 220 extend into one of the wells $MP_{Well}$ on a microtiter plate MP. When inserted into a well $MP_{Well}$, the grooves 229 on each projection 220 cooperate with the inner wall (unnumbered) of the corresponding well $MP_{Well}$ to form peripheral outlet channels through which fluid displaced from the well $MP_{Well}$ upon insertion of the projection 220 can exit the well $MP_{Well}$.

Each lid 200 preferably has a uniform array of 6, 24, 96, 384 or 1536 projections, configured, arranged and sized to mate with the same number of wells $MP_{Well}$ on a microtiter plate MP.

Each projection 220 preferably has (−) a longitudinal x length of between 4 to 12 mm, (−) a convex distal end 222 with a radius of curvature of between about 2 to 10 times the outer width y or z of the projection 220, and (−) between 2 and 10, more preferably between 2 and 6, and most preferably between 4 and 6, uniformly circumferentially spaced longitudinally x extending grooves 229. All projections 220 on a lid 200 are preferably of uniform dimension.

The grooves 229 are preferably configured, arranged and sized and form peripheral outlet channels having a radial cross-section of between 0.1 and 0.4 mm² when the projection 220 is sealingly engaged within a well $MP_{Well}$ on a microtiter plate MP.

The peripheral outlet channels are preferably in fluid communication with atmosphere through openings (not numbered) in the cover plate 210.

The lid 200 is preferably formed as a single piece from an oxygen barrier material, most preferably a material having an oxygen transmission rate of less than 16 cm³/m²/24 hr at 23° C. and 0% RH.

Oxygen-sensitive photoluminescent probes capable of sensing and reporting the oxygen concentration of an environment in fluid communication with the probe are widely known. See for example, United States Published Patent Applications 2011/0136247, 2009/0029402, 2008/199360, 2008/190172, 2007/0042412, and 2004/0033575; U.S. Pat. Nos. 8,242,162, 8,158,438, 7,862,770, 7,849,729, 7,749,768, 7,679,745, 7,674,626, 7,569,395, 7,534,615, 7,368,153, 7,138,270, 6,989,246, 6,689,438, 6,395,506, 6,379,969, 6,080,574, 5,885,843, 5,863,460, 5,718,842, 5,595,708, 5,567,598, 5,462,879, 5,407,892, 5,094,959, 5,030,420, 4,965,087, 4,810,655, and 4,476,870; PCT International Published Application WO 2008/146087; and European Published Patent Application EP 1134583, all of which are hereby incorporated by reference. Such optical sensors are available from a number of suppliers, including Presens Precision Sensing, GmbH of Regensburg, Germany, Oxysense of Dallas, Texas, USA, and Luxcel Biosciences, Ltd of Cork, Ireland.

Methods and techniques for sensing of oxygen within a test tube or well of a microtiter plate using oxygen-sensitive photoluminescent probes are widely known as exemplified by WO2012/052068, US Pat. Appln. Pub 2013/0280751 and US Pat. Appln Pub. 2014/0147882, all incorporated herein by reference. These methods and techniques are suitable for use in determining oxygen concentration within a test tube or well sealed with an implement in accordance with the present invention.

Instruments suitable for reading oxygen-sensitive photoluminescent probes within wells of a microtiter plate are known and available from a number of sources, including the CLARIOstar plate reader from BMG Labtech GmbH of Ortenberg, Germany.

Oxygen concentration within a test tube T may be measured and monitored using a stopper 100 in accordance with the first embodiment of the invention by: (a) placing an oxygen-sensitive photoluminescent material and a fluid test sample within a cavity $T_9$ of a test tube T, (b) inserting the stopper 100 into frictional engagement within the cavity $T_9$ of a test tube T to form an enclosed chamber with peripheral outlet channels 119 formed between the stopper 100 and the test tube T through which fluidic content within the cavity $T_9$ of a test tube T, displaced by insertion of the stopper 100 into the cavity $T_9$ of a test tube T, can be discharged from the cavity $T_9$, and (c) ascertaining oxygen concentration within the enclosed chamber by exposing the oxygen-sensitive photoluminescent material within the enclosed chamber to excitation radiation passed through the stopper 100 to create excited oxygen-sensitive photoluminescent material, measuring radiation emitted by the excited oxygen-sensitive photoluminescent material through the stopper 100, and converting the measured emission to a target-analyte concentration based upon a known conversion algorithm.

Figure 12:
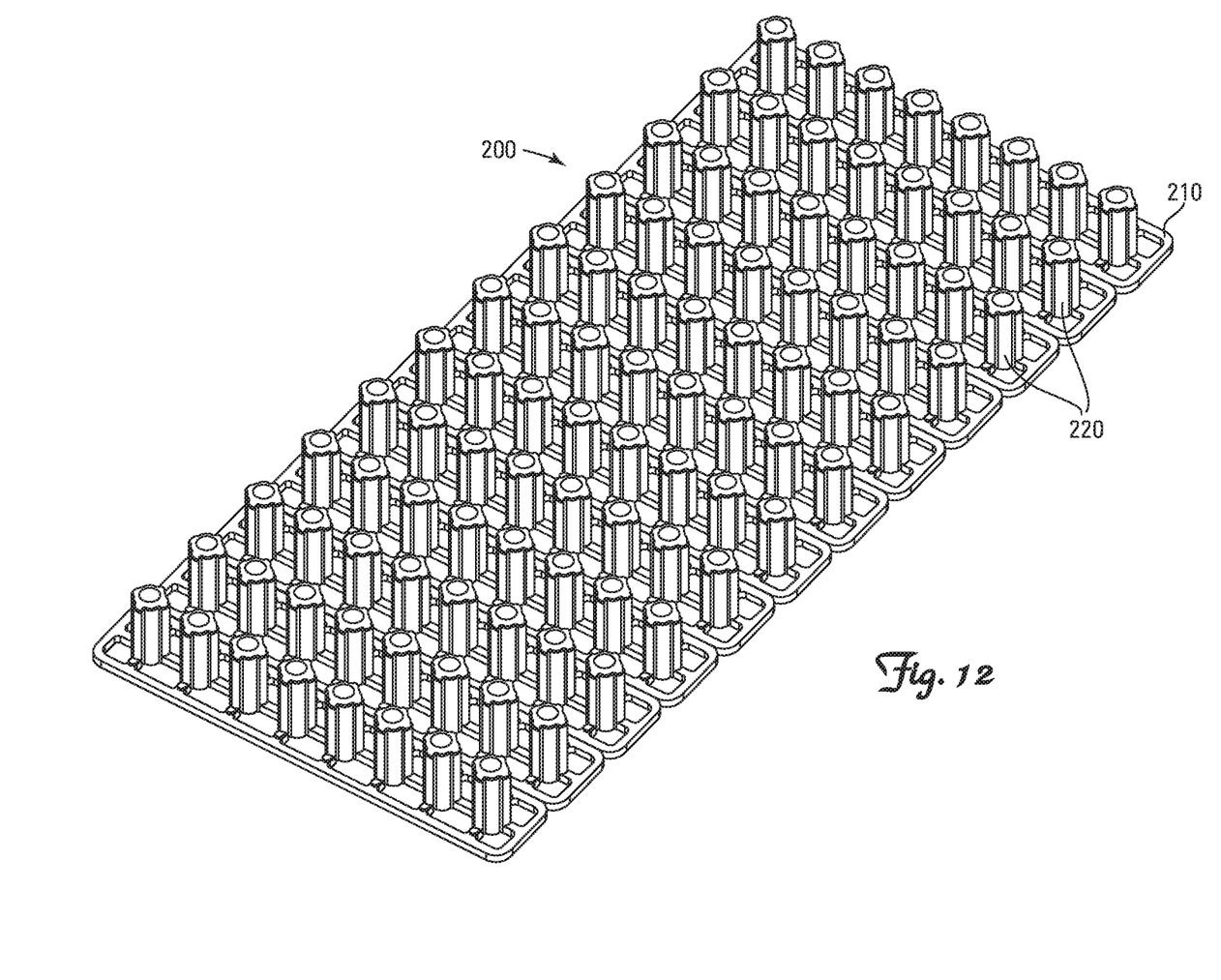
FIG. 12 is perspective view of a third embodiment of the invention suitable for use as a lid for a standard 96 well microtiter plate.
Figure 13:
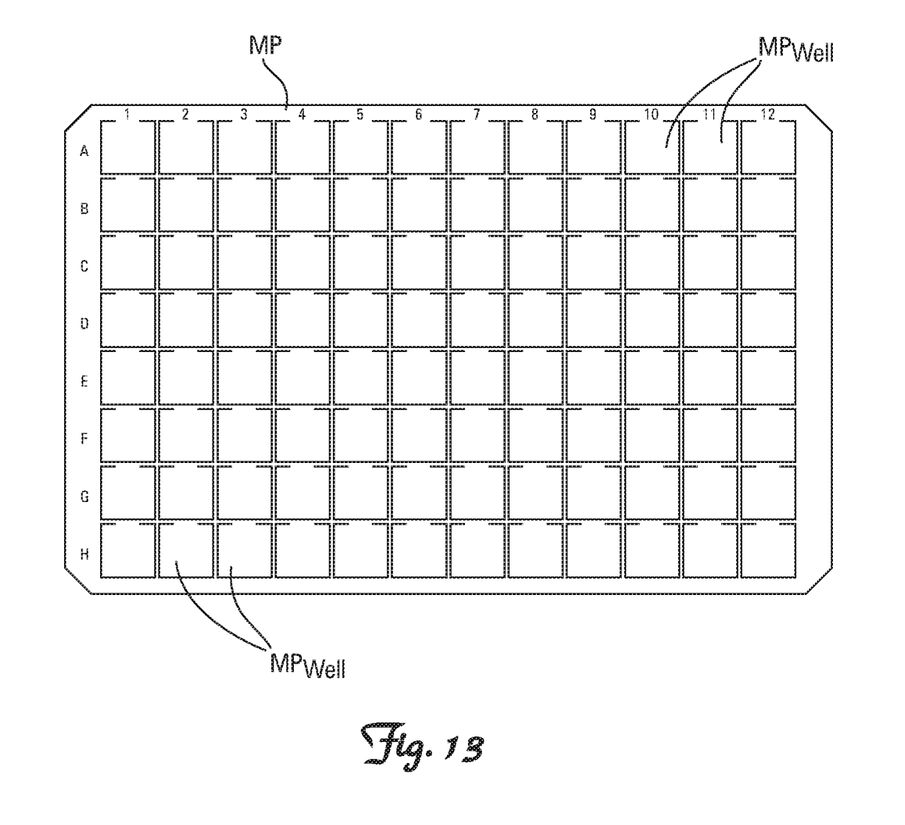
FIG. 13 is a top view of a standard 96 well microtiter plate.

In a similar fashion, oxygen concentration within each well $MP_{Well}$ of a microtiter plate MP may be measured and monitored using a lid 200 in accordance with the second embodiment of the invention by: (a) placing an oxygen-sensitive photoluminescent material and a fluid test sample within each of a plurality of wells $MP_{Well}$ in a microtiter plate MP, (b) covering the microtiter plate MP with a lid 200 in accordance with the second embodiment of the invention whereby each projection 220 on the lid 200 extends into and sealingly engages within each well $MP_{Well}$ in the microtiter plate MP as the cover plate 210 is placed over and secured to the microtiter plate MP, thereby displacing fluid from within each well $MP_{Well}$ towards the periphery of the projection 220 and out of the well $MP_{Well}$ through peripheral outlet channels formed between the projection 220 and the well $MP_{Well}$, and (c) ascertaining oxygen concentration within each well $MP_{Well}$ of the covered microtiter plate MP by exposing the oxygen-sensitive photoluminescent material within each $MP_{Well}$ to excitation radiation passed through the projection 220 extending therein to create excited oxygen-sensitive photoluminescent material, measuring radiation emitted by the excited oxygen-sensitive photoluminescent material through the projection 220, and converting the measured emission to a target-analyte concentration based upon a known conversion algorithm.

We claim:

1. A lid for a microtiter plate having any array of wells, the lid formed from an oxygen barrier material and comprising:
    (a) a cover plate for engaging the microtiter plate, and
    (b) projections extending longitudinally from the cover plate in an array conforming with the array of wells, with each projection (i) configured and arranged to longitudinally and sealingly project into a corresponding well in the microtiter plate, (ii) having an outwardly projecting convex distal end, and (iii) having a plurality of longitudinally extending grooves operable for providing peripheral outlet channels between the projection and the well through which fluidic content within the well, displaced by insertion of the projection into the well, can be discharged from the well.

2. The lid of claim 1 wherein the projections have a longitudinal length and a lateral outer width, and the convex distal end of each projection has a radius of curvature of between about 2 to 10 times the outer width of the projection.

3. The lid according to claim 1 wherein the lid is formed from a material having an oxygen transmission rate of less than 16 $cm^3/m^2/24$ hr at 23° C. and 0% RH.

4. The lid according to claim 1 wherein each projection has a longitudinal length of between 4 to 12 mm and between 2 and 10 longitudinally extending grooves.

5. The lid according to claim 1 wherein each projection has between 4 and 6 uniformly circumferentially spaced longitudinally extending grooves.

6. The lid according to claim 1 wherein the peripheral outlet channels are in fluid communication with atmosphere through openings in the cover plate.

7. The lid according to claim 1 wherein the grooves on each projection form peripheral outlet channels having a radial cross-section of between 0.1 and 0.4 $mm^2$ when the projection is sealingly engaged within a well.

8. An assembly comprising:
    (a) a microtiter plate formed from an oxygen barrier material and having an array of wells, and
    (b) a lid according to claim 1 configured and arranged for fitted engagement over the microtiter plate with the projections extending longitudinally from the cover plate in an array conforming with the array of wells in the microtiter plate whereby the projections extend into the wells when the lid is placed over the microtiter plate.

9. A method of measuring oxygen concentration within a test tube, comprising the steps of:
    (a) placing an oxygen-sensitive photoluminescent material and a fluid test sample within a cavity of a test tube,
    (b) inserting an implement into frictional engagement within the cavity of the tube to form an enclosed chamber, wherein the implement comprises a stopper formed from an oxygen barrier material configured and arranged to longitudinally and sealingly project into a cavity of the test tube, the stopper having an outwardly projecting convex distal end and a plurality of longitudinally extending grooves operable for providing peripheral outlet channels between the stopper and the test tube, forming the peripheral outlet channels between the implement and the test tube through which fluidic content within the cavity of the test tube, displaced by insertion of the implement into the cavity of the test tube, can be discharged from the cavity, and
    (c) ascertaining oxygen concentration within the enclosed chamber by (i) exposing the oxygen-sensitive photoluminescent material within the enclosed chamber to excitation radiation passed through the implement to create excited oxygen-sensitive photoluminescent material, (ii) measuring radiation emitted by the excited oxygen-sensitive photoluminescent material through the implement, and (iii) converting the measured emission to a target-analyte concentration based upon a known conversion algorithm.

10. The method according to claim 9 wherein the implement is inserted a distance sufficient to displace fluid test sample into each peripheral outlet channel.

11. A method of measuring oxygen concentration within an array of wells in a microtiter plate, comprising the steps of:
    (a) obtaining an assembly in accordance with claim 8,
    (b) placing an oxygen-sensitive photoluminescent material and a fluid test sample within the plurality of wells in the microtiter plate,
    (c) covering the microtiter plate with the cover plate whereby each projection extends into and sealingly engages within each well in the microtiter plate so as to displace fluid from within each well towards the periphery of the projection and out of the well through peripheral outlet channels formed between the projection and the well, and
    (d) ascertaining oxygen concentration within each well of the covered microtiter plate by (i) exposing the oxygen-sensitive photoluminescent material within each well to excitation radiation passed through the projection extending therein to create excited oxygen-sensitive photoluminescent material, (ii) measuring radiation emitted by the excited oxygen-sensitive photoluminescent material through the projection, and (iii) converting the measured emission to a target-analyte concentration based upon a known conversion algorithm.

12. The method according to claim 11 wherein sufficient fluid test sample is placed within each well that fluid test sample is displaced into each peripheral outlet channel in each well when the cover plate is secured to the microtiter plate.

13. The method according to claim 9 wherein the oxygen-sensitive photoluminescent material comprises an oxygen-sensitive indicator dye incorporated in an oxygen permeable polymeric matrix.

14. The method according to claim 9 wherein the fluid test sample contains viable cells or viable microbes.

\* \* \* \* \*